(12) United States Patent
LeComte et al.

(10) Patent No.: US 7,613,298 B2
(45) Date of Patent: Nov. 3, 2009

(54) SYSTEM AND PROCESS FOR ADAPTIVE AND PROGRESSIVE SCRAMBLING OF VIDEO STREAMS

(75) Inventors: Daniel LeComte, Paris (FR); Pierre Sarda, Asnières-sur-Seine (FR); Daniela Parayre-Mitzova, Paris (FR); Sébastien Georges, Paris (FR)

(73) Assignee: Medialive (FR)

( * ) Notice: Subject to any disclaimer, the term of this patent is extended or adjusted under 35 U.S.C. 154(b) by 930 days.

(21) Appl. No.: 11/091,793

(22) Filed: Mar. 28, 2005

(65) Prior Publication Data

US 2005/0185821 A1 Aug. 25, 2005

Related U.S. Application Data

(63) Continuation of application No. PCT/FR03/02914, filed on Oct. 3, 2003.

(30) Foreign Application Priority Data

Oct. 3, 2002 (FR) .................................. 02 12269

(51) Int. Cl.
*H04N 7/167* (2006.01)
*H04L 9/00* (2006.01)

(52) U.S. Cl. .......................... 380/201; 380/33; 380/34; 380/35; 380/36; 380/37; 713/151; 713/152; 382/100

(58) Field of Classification Search .................. 380/201
See application file for complete search history.

(56) References Cited

U.S. PATENT DOCUMENTS 5,754,658 A 5/1998 Aucsmith 5,953,506 A * 9/1999 Kalra et al. .................. 709/231
6,938,270 B2 * 8/2005 Blackketter et al. ......... 725/112
2001/0053222 A1 12/2001 Wakao et al.
2003/0123738 A1 * 7/2003 Frojdh et al. ................. 382/236

FOREIGN PATENT DOCUMENTS

| DE | EP 1033880 | * 9/2000 |
| EP | 0 993 142 A1 | 4/2000 |
| EP | 1 033 880 A2 | 9/2000 |
| FR | 2 812 147 A1 | 1/2002 |
| GB | EP 0993142 | * 4/2000 |
| WO | WO 00/31964 | 6/2000 |
| WO | WO 01/69354 A2 | 9/2001 |

OTHER PUBLICATIONS

Howard Chi Ho Cheng, *Partial Encryption for Image and Video Communication*, University of Alberta, Department of Computing Science, Edmonton, Alberta, 1998, pp. 1-87.

Thomas Kunkelmann et al., *Video Encryption Based on Data Partitioning and Scalable Coding—A Comparison*, Interactive Distributed Multimedia Systems and Telecommunication Services, Sep. 8, 1998, pp. 95-106.

Hiroshi Fujii et al., *Partial-scrambling of Information*, NTT Review, Telecommunications Association, Tokyo, Japan, vol. 11, No. 1, Jan. 1999, pp. 116-123.

* cited by examiner

*Primary Examiner*—Longbit Chai
(74) *Attorney, Agent, or Firm*—DLA Piper LLP (US)

(57) ABSTRACT

A process for distributing digital video sequences in accordance with a nominal stream format including a succession of frames, each frame including at least one digital block regrouping a plurality of coefficients corresponding to simple, digitally coded visual elements is disclosed.

22 Claims, 1 Drawing Sheet

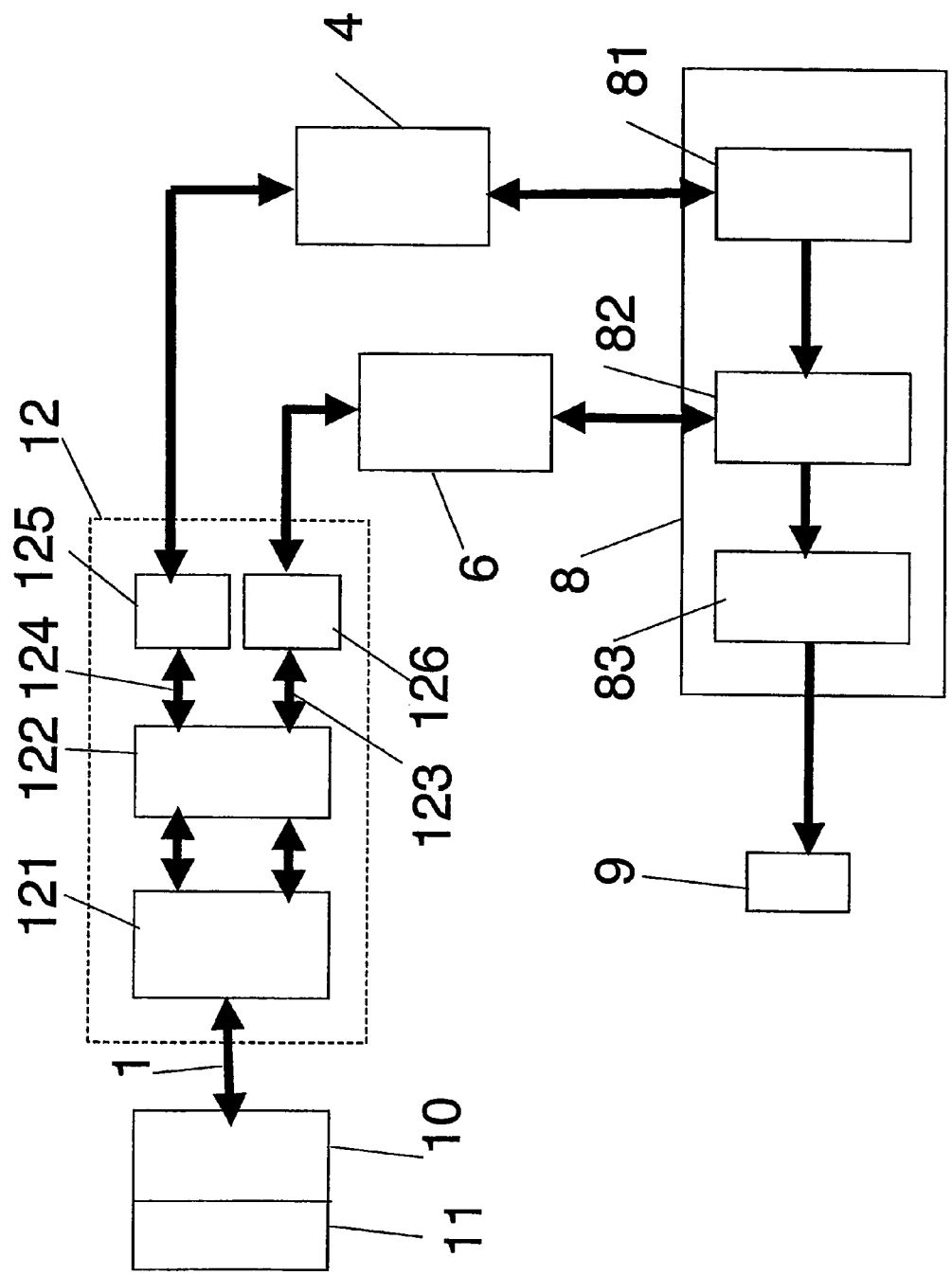

SYSTEM AND PROCESS FOR ADAPTIVE AND PROGRESSIVE SCRAMBLING OF VIDEO STREAMS

RELATED APPLICATION

This is a continuation of International Application No. PCT/FR2003/002914, with an international filing date of Oct. 3, 2003 (WO 2004/032510 A1, published Apr. 15, 2004), which is based on French Patent Application No. 02/12269, filed Oct. 3, 2002.

TECHNICAL FIELD

Our disclosure relates to processing of digital video streams. More particularly, we provide a system that allows digital video content to be visually scrambled and recomposed.

BACKGROUND

WO 00 55089 A discloses a method and system for scrambling compressed or non-compressed digital samples representing audio and video data in such a manner that the content of these samples is degraded but recognizable or, if not, supplied with a required given quality. A given number of LSB's (least significant bits) of the data is scrambled for each sample frame by frame in an adaptive manner as a function of the dynamics of possible values and the most significant bits are unchanged. This solution represents an encrypting solution well known in the art with the aid of cryptographic keys. This method is not adaptive as a function of the content of the audiovisual stream nor as a function of other characteristics such as the throughput, type of frames, the user profile or the different layers of scalability characterizing it. Moreover, all the information initially contained in the stream remains inside the protected stream. This solution does not satisfy the criteria of strong security.

WO 01/97520, "Video Interface Device, Distribution System and Method of Transferring Programs and Encoded Video Sequences Through The Communication Network" discloses a device for the secure broadcasting of protected video streams. The protection of the video stream is brought about by replacing certain original images I by "false" images I or by interchanging certain images I among themselves. The original images I extracted from the video stream are stored separately from the protected stream and are sent to the user when he desires to view the video. Thus, replacing the original images I by "false" images I modifies the size of the protected stream relative to the original stream. Moreover, an ill-disposed user can readily detect a false image I with subscript n because this image with subscript n is very different from the image I with subscript n−1 and from image I with subscript n+1; the user can then easily replace it by image I with subscript n−1 or subscript n+1 or by an image calculated by interpolation between the images I with subscript n−1 and n+1, thus re-creating a stream very similar to the original one. Therefore, that solution does not satisfy the criterion of high security and adaptability of the protection of video streams.

EP 1 033 880 A2 (SHARP KK) discloses a process and device for protecting digital video streams and fixed images based on DCT and wavelet transformations. The modifications applied to the spatio-frequential coefficients are of the type: Scrambling of the bit of the sign of the coefficients, scrambling of the enhancement bits of the coefficients, scrambling of selected blocks and movement vectors in the P and B images, selection of appropriate coefficients belonging to a slice or to a frequential subband and interchanging them, bringing about the rotation of a block regrouping frequential coefficients. The protection is removed in a classic manner known to the expert in the art with the aid of decryption keys. EP '880 does not satisfy the security objectives because all the original data describing the stream is located inside the protective stream.

U.S. Pat. No. 5,754,658 (INTEL Corporation) discloses a method and a device for storing encoded data. The data is encrypted by different encryption techniques and the encryption is adaptive as a function of the overloading of the microprocessor of the encoder and/or of the decoder. The protection is not adaptive as a function of the desired visual degradation or as a function of the structure and the content of the video streams. Moreover, the applied protections are various encryption techniques and all the data initially presented remain integrally in the protected stream.

US 2001/0053222 A1 discloses a classic encryption solution based on keys. Even if the encryption is complex with four keys being used, all the information necessary for the reconstitution are present in the protected video stream.

WO 00/31964 (ERICSSON) relates to a method and equipment for the partial encryption of images and their progressive transmission. A first part of the image is compressed to a low quality without encryption and a second part (composed by two sections) of the image is encrypted. Each section is encrypted with its own method and its own key. This document presents a classic encryption step and therefore does not satisfy the criteria and objectives of our disclosure of high security because all the information describing the content is present inside the protected stream.

XP00997705 (Thomas KUNKELMANN and Uwe HORN) concerns the protection of video streams from video encoders based on DCT. In order to reduce the resources for the encryption, XP '705 proposes a method for a partial encryption of data based on the property of partitioning data while leaving the two parts physically in the same stream and based on scalabilities of time and space. XP '705 does not resolve the relevant problems because it proposes encryption techniques that are well-known in the art that interchange the data inside the stream or add encryption keys but while retaining all the data describing the stream inside it.

With the goal of separating a digital product into different portions in order to protect it, WO 01 69354 A3 (MICROSOFT CORP.) relates to the protection of a digital product (software or audio or video content) by breaking it down into at least two portions. The first portion is transmitted to the client equipment by physical means. The second portion is transformed in such a manner that it can only be used by the client station concerned, then it is transmitted integrally by the same process or by a communication network to this client station. The client station receiving the two portions can modify the first portion as a function of a key transmitted by the server from which key two other keys are generated in order that this first portion is compatible with the second portion received. These two portions are recombined together to restore a binary product modified in substance equivalent to the original product, but different in terms of configuration and adequate for the client equipment. WO '354 does not have any embodiment of a treatment performed on the two portions and no digital video format is cited. Moreover, the conformity with the original stream of either of the two parts initially separated is neither described nor suggested. Also, a separation of the digital product into two portions is made but all the elements of the digital product remain in the two portions transmitted to the user. The two encrypted portions are sent via two different paths and in two steps but are sent integrally. That invention does not satisfy the criteria of security and adaptation on the one hand on account of the use of the encryption method and on the other hand the adaptation limited to the equipment of each user.

It would therefore be advantageous to apply an adaptive and progressive scrambling as a function of the structure of the video bitstream and/or of its contents.

SUMMARY

We provide a process for distributing digital video sequences in accordance with a nominal stream format including a succession of frames, each frame including at least one digital block regrouping a plurality of coefficients corresponding to simple, digitally coded visual elements, including a step of modifying at least one block of the stream, wherein the modification step acts in an adaptive manner on the original stream as a function of at least a part of characteristics representative of structure, contents and parameters of an original video stream, of a profile of an addressee, and of external events, and the modification step includes replacing a part of the coefficients to produce a modified main video stream in nominal format and complimentary modification information that allows reconstruction of the original stream by a decoder of addressed equipment, and wherein the scope of modifications is variable and determined by the representative characteristics, and the modified main video stream and the complementary information are transmitted by separate paths.

We also provide a system for distributing video sequences including a video server with means for broadcasting a modified stream in conformity with the distribution process, a plurality of pieces of equipment provided with a scrambling circuit, wherein the server further includes means for recording a digital profile of each addressee and means for control command of modification means as a function of input variables corresponding to at least a part of the characteristics representative of the structure, the contents and the parameters of the original video stream, of the profile of the addressee and of external events.

BRIEF DESCRIPTION OF THE DRAWING

The disclosure will be better understood with the aid of the following description, made purely by way of an explanatory example, of an embodiment of our disclosure with reference made to the attached drawing.

The Drawing is a schematic block diagram showing a particular aspect of the client-server system.

DETAILED DESCRIPTION

We provide a device capable of transmitting a set of high visual quality films in a secure manner to a TV screen and/or to be recorded on the hard disk of a set-top decoder box connecting the communication network to a viewing screen such as a TV screen or a personal computer monitor while preserving the audiovisual quality yet avoiding fraudulent use such as the possibility of making pirated copies of films or of audiovisual programs recorded on the hard disk of the set-top decoder box.

We also provide a process for distributing digital video sequences in accordance with a nominal stream format constituted of a succession of frames, each of which comprises at least one digital block regrouping a certain number of coefficients corresponding to simple video elements coded digitally according to a manner specified in the stream concerned and used by all the decoders capable of displaying it in order to be able to decode it correctly. This process comprises:

modifying at least one of the coefficients, transmitting a main stream in conformity with the nominal format, constituted of planes containing the blocks modified, and by a path, separate from the main stream, of complementary digital information allowing the original stream to be reconstituted from calculation on the addressed equipment as a function of the main stream and of the complementary information.

Reconstitution of the original stream is made on the addressed equipment from the modified main stream already present on the addressed equipment and from the complementary information sent in real time comprising data and functions executed with the aid of digital routines (set of instructions).

The term "scrambling" denotes modification of a digital video stream by appropriate methods in such a manner that the stream remains in conformity with the norm with which it was digitally encoded while rendering it displayable by a reader (or viewer or display or player), but altered as regards human visual perception.

The term "de-scrambling" denotes the process of restoration of the initial stream by appropriate methods. The video stream restored after the de-scrambling is identical to the initial video stream.

Many scrambling systems have an immediate effect in that either the initial stream is totally scrambled or the initial stream is not scrambled at all and thus generally different video sequences can be scrambled with the same algorithm and the same regulating parameters. Numerous protections used do not change the scrambling of a video stream as a function of its contents.

An adaptive and progressive scrambling is applied as a function of the structure of the video stream (bitstream) and/ or of its contents by changing the algorithms and/or the parameters of the scrambling as a function of the characteristics of the video stream and of the user application to realize a reliable protection from the viewpoint of deterioration of the original stream and of resistance to pirating at a minimum cost while ensuring the quality of service required by the viewer or the client. Different scrambling adaptations are applied such as, e.g., those cited below.

A digital video stream is generally constituted of sequences of images grouped in groups of images "groups of pictures" (GOP's). An image can be of type I (intra), P (predicted), B (bidirectional). A plane S is a plane containing a static object that is a fixed image describing the background of the image or a plane coded using a prediction based on the global movement compensation (GMC) starting from a previous reference plane. The I images are reference images and entirely coded and therefore of an elevated size and do not contain information about the movement. The P images are planes predicted from previous planes, whether I and/or P by vectors of movement in only one direction called "forward." The B planes are called "bidirectional" and are connected to planes I and/or P preceding them or following them by vectors of movement in the two directions in time (forward and back or backward). The movement vectors represent two-dimensional vectors used for the compensation of movements that bring about the difference of coordinates between a part of the current image and a part of the reference image.

An adaptation is applied as a function of the scenes contained in the video stream: The video streams contain different sequences in which the proportion between the fixed, static and dynamic planes (as regards the content of the scenes of the stream) varies greatly. The protection that can be effective for dynamic scenes containing a lot of movements can prove to be ineffective for static scenes with little movement. Given knowledge of the contents of the video streams in advance, a change of algorithms and/or of scrambling parameters can be defined as a function of the various landscape scenes, actions, videoconference type, animated cartoon type, etc. By adapting the parameters in this manner the totality of the scene or just a given part can be protected, but this will render the sequence non-viewable and the size of this "complementary information" will be considerably reduced. For example, in a stream of the "videoconference "type it is sufficient to scramble the persons uniquely and not the totality also comprising the fixed background. Scrambling a stream can be carried out as a function of the scenes contained in it by two different processes:

either with an algorithm that brings about the detection in advance of the forms and/or of the movements and the analysis of the scene for delimiting the zone to be scrambled;

or without detection of the forms and analysis of the scene but applying the parametric combinations appropriate for deteriorating the desired zone or zones.

For example, deterioration of the movement vectors disturbs essentially all the parts in movement and very little of the scenery.

An adaptation is also applied as a function of the structure of the video stream, especially as a function of the length of the groups of video planes (GOP's) determining the proportion between the number of I, P and B images. If there is a parametric combination that deteriorates only the I images and if the GOP period is long, the scrambling cannot be effective.

An adaptation of the parameters is also applied as a function of the plane type (I, P, B, S).

An adaptation of the parameters is also applied as a function of the size of the frames (in number of pixels). The same parametric combination can cause much more significant degradations for the streams with small-sized frames and vice versa. A parametric adaptation is also applied as a function of the spatial scalability characterizing certain video streams relative to the change in size in pixels. The notion of "scalability" is defined from the English word "scalability", which characterizes an encoder capable of encoding or a decoder capable of decoding an ordered set of binary streams in such a manner as to produce or reconstitute a multilayer sequence.

An adaptation of the parameters of scrambling is also applied as a function of the granular scalability characterizing certain video streams. The notion of "granular scalability" is defined from the English expression "granular scalability" used in the MPEG-4 norm that characterizes an encoder capable of encoding or a decoder capable of decoding an ordered set of binary streams in such a manner as to produce or reconstitute a multilayer sequence. "Granularity" is defined as the quantity of information that can be transmitted by layer of a system characterized by any scalability, which system is then also granular.

An adaptation is also applied as a function of the throughput in number of bits per second (bits/s) of the video stream, whether it is constant or variable. For example, a scrambling that is sufficient for a throughput of 2 Mbits/s proves to be less efficient for much greater throughputs.

For certain more complex streams (like those of the MPEG-4 type) an adaptive scrambling is applied as a function of the types of objects of the profile of the level, designating the complexity and the options used during the construction of the video stream.

An adaptation is applied as a function of the number of frames per second of the video stream. For certain streams characterized by a time-dependent scalability an adaptive scrambling is applied as a function of the variable number of frames per second.

A progressive scrambling is also applied in such a manner that the user begins to view the non-scrambled video stream. Then, a slight scrambling begins that is reinforced more and more until the stream becomes entirely scrambled. The goal striven for is to awaken the interest of the user for the video stream but while removing the viewing rights from him if he did not purchase them. A realization of this application is to scramble the video stream with one or more given algorithms while progressively modifying the scrambling parameters during a determined time period in such a manner as to increase the disagreement until a completely scrambled stream is attained.

An adaptive scrambling is generally realized as a function of the contents, the characteristics, the structure and the composition of the digital flux defined by a given standard.

A scrambling is also realized with a random generation of parametric combinations to be applied for the scrambling of the video stream. A robust protection that is difficult to attack and can not be pirated by an ill-disposed person is assured in this manner. The disadvantage that can occur is that after this random parametric generation certain sequences can not be sufficiently scrambled due to the fact that the random generator does not take the stream contents into account.

An adaptation of the scrambling parameters and algorithms is also applied as a function of the profile of the addressee, as a function of the behavior of the addressee during the connection to the server (e.g., the regularity and the acceptance of payments), as a function of habits (e.g., time, hour of connection), as a function of characteristics (e.g., age, sex, religion, community), or as a function of data communicated by a third party (e.g., acceptance in associations or included in databases of consumers).

An adaptation of the scrambling parameters and algorithms is also applied as a function of external events, e.g., broadcasting hour, audience rate, socio-political events, disturbances during broadcasting.

In the most general sense, we provide a process for distributing digital video sequences according to a nominal stream format constituted of a succession of frames, each of which comprises at least one block regrouping a plurality of coefficients corresponding to digitally coded, simple visual elements, which process comprises a step for modifying at least one block of the original stream, characterized in that this modification step acts in an adaptive manner on the original stream as a function of at least a part of the characteristics representative of the structure, the contents and the parameters of the original video stream, of the profile of the addressee, and of external events.

The modification step preferably comprises replacing a part of the coefficients to produce on the one hand a main video stream in nominal format and on the other hand complimentary modification information that allows the reconstruction of the original stream by a decoder of the addressed equipment. The scope of the modifications is variable and determined by the representative characteristics.

According to one aspect the modified mainstream is recorded on the addressed equipment prior to the transmission of the complementary information to the addressed equipment. According to another aspect the modified mainstream and the complementary information are transmitted together in real time. This complimentary modification information advantageously comprises at least one digital routine suitable for executing a function. According to a particular realization this complimentary modification information is subdivided into at least two subparts.

According to a variant these subparts of the complementary modification information can be distributed by different media. According to another variant the subparts of the complementary modification information can be distributed by the same media.

According to a particular realization the complementary information is transmitted on a physical vector. According to a variant the complementary information is transmitted online. According to a particular realization these digital images use technologies based on wavelets.

The video streams are preferably organized in frames constituted of blocks corresponding to at least one plane I, one plane P, at least one other image I or P and also capable of containing at least one plane B corresponding to the differences between two P images and S planes.

These images I, P, B and S are advantageously modified in a differentiated manner as a function of their type, namely, I, P, B or S.

According to a variant images I, P, B and S are modified in a differentiated manner as a function of the characteristics of the video stream in terms of the structure of the GOP groups of images and of the proportions between the quantities of I, P and B images present in the video streams, which latter are characterized by a number of planes per second that is constant or variable or characterized by a time-dependent scalability.

According to another variant images I, P, B and S are modified in a differentiated manner as a function of the constant or variable number of planes (frames) per second for the streams characterized by the time-dependent scalability.

According to another aspect images I, P, B and S are modified in a differentiated manner as a function of the characteristics of the scenes contained in the stream in terms of fixed, static or dynamic planes and/or of the visual forms contained, and/or as a function of the granular scalability.

Images I, P, B and S are advantageously modified in a differentiated manner as a function of the characteristics of the streams in terms of the size of the planes (in number of pixels), whether it is constant or variable for the streams characterized by the spatial scalability.

Images I, P, B and S may be modified in a differentiated manner as a function of the characteristics of the streams in terms of throughput in bits per second of the video stream.

Images I, P, B and S are advantageously modified in a differentiated manner as a function of the characteristics of the video streams in terms of the composition in objects, profiles and levels.

Images I, P, B and S may be modified in a progressive manner increasing the degradation effect until the complete scrambling of the video stream.

According to a variant images I, P, B and S are modified by a random generation of scrambling parameters and configurations.

According to another variant the scrambling is adaptive as a function of the content, characteristics, structure and the composition of the video stream of which the nominal stream format is defined by the MPEG-1 or MPEG-2 or MPEG-4 or other norm.

According to another aspect the process comprises a preceding analog/digital conversion step in a structured format and is applied to an analog video signal.

The video stream reconstituted from the modified main stream and from the complementary information may be strictly identical to the original stream.

We provide a system for distributing video sequences comprising a video server with means for broadcasting a modified stream in conformity with any one of the previous processes, and a plurality of pieces of equipment provided with a scrambling circuit, characterized in that the server also comprises means for recording the digital profile of each addressee and means for the control command of modification means as a function of input variables corresponding to at least a part of the characteristics representative of the structure, the contents and the parameters of the original video stream, of the profile of the addressee and of external events.

One aspect will now be considered in connection with the attached Drawing, which represents a particular realization of the client-server system in conformity with our disclosure.

The video stream of the MPEG-2 type to be secured 1 is passed to a system for analysis 121 and scrambling 122 that generates a modified main stream and complementary information at the output.

Original stream 1 can be directly in digital form 10 or in analog form 11. In the latter instance, analog stream 11 is converted by a coder (not shown) to a digital format 10. In the remainder of the text we take note 1 of the digital video input stream.

A first stream 124 in MPEG-2 format with a format identical to digital input stream 1 and outside of which certain coefficients, values and/or vectors have been modified is placed in output buffer memory 125. The complementary information 123 in any format contains the references of the video sample parts that were modified and is placed in buffer 126. Analysis 121 and scrambling 122 system decides which adaptive scrambling to apply and which parameters of the stream to modify as a function of the characteristics of input stream 1 and also as a function of the client rights, and in what matter to apply the modifications, e.g., progressive or not.

Stream MPEG-2 125 is then transmitted via high throughput network 4 of the microwave, cable, satellite type or the like to the client 8 and more precisely into memory 81 of the RAM, ROM hard disk type. When the addressee 8 requests to view a video sequence present in memory 81, two outcomes are possible:

- either addressee 8 does not have the rights necessary to view the video sequence. In that case, stream 125 generated by scrambling system 122 present in memory 81 is passed to synthesis system 82 that does not modify it and transmits it identically to classic video reader 83 and its content, heavily degraded visually, is displayed by a player 83 on a screen 9;
- or addressee 8 has the right to view the video sequence. Server 12 transmits appropriate complementary information 126 via connection 6 corresponding to the type of scrambling carried out as a function of the rights of the addressee. In that case, the synthesis system makes a viewing request to server 12 containing the information necessary 126 for the recovery of the original video sequence 1. Server 12 then sends the complementary information 126 by connection 6 via telecommunication networks of the analog or digital telephone line type, DSL (digital subscriber line), BLR (local radio loop), DAB (digital audio broadcasting) or by digital mobile telecommunications (GBM, GPRS, UMTS), which information allows the reconstitution of the video sequence in such a manner that client 8 can view and/or store the video sequence. Synthesis system 82 then proceeds to descramble the video by reconstructing the original stream by combining modified main stream 125 and complementary information 126. The video stream obtained at the output of synthesis system 82 is then transmitted to classic video reader 83 and the original video film is displayed on screen 9.

The invention claimed is:

1. A process for distributing digital video sequences in accordance with a nominal stream format comprising a succession of frames, each frame comprising at least one digital block regrouping a plurality of coefficients corresponding to simple, digitally coded visual elements comprising:

a step of providing a video stream analysis system, a video scrambling system and first memory each in communication with a server;

a step of providing a second memory, a synthesis system and video player each in communication with an addressable client having a digital rights profile;

a step of providing a network in communication with the server and addressable client;

a step of providing an original digital video stream to the video analysis system to identify the characteristics representative of the data structure, contents and parameters of the original digital video stream;

a step of communicating the digital rights of the addressable client and a profile of external events to the server;

a step of modifying at least one digital block of the original digital video stream with the video scrambling system, wherein the modifications of the original digital video stream are a function of at least a part of the characteristics representative of the data structure, contents and parameters of the original digital video stream and the digital rights of the addressable client and the profile of external events, by replacing a part of the coefficients of a data block to produce a visually deteriorated modified main video stream in the nominal stream format;

a step of producing complementary modification information with the video scrambling system that allows reconstruction of the original video stream with the synthesis system;

a step of transmitting the visually deteriorated modified main video stream in the nominal stream format through a first connection, via the network and addressable client, to the second memory; and a step of transmitting the complementary modification information of said at least one modified digital block through a separate second connection, via the network and addressable client, to the synthesis system based upon the digital rights profile;

whereby digital video sequences in accordance with a nominal stream format comprising a succession of frames, each frame comprising at least one digital block regrouping a plurality of coefficients corresponding to simple, digitally coded visual elements are distributed.

2. The process according to claim 1, wherein the complementary modification information comprises at least one digital routine suitable for carrying out a function.

3. The process according to claim 1, wherein the complementary modification information is subdivided into at least two subparts.

4. The process according to claim 3, wherein subparts of the complementary modification information are distributed by different media.

5. The process according to claim 3, wherein the subparts of the complementary modification information can be distributed by the same media.

6. The process according to claim 1, wherein the complementary modification information is transmitted on a physical vector.

7. The process according to claim 1, wherein the complementary modification information is transmitted online.

8. The process according to claim 1, wherein a digital image in the digital video sequences uses technologies based on wavelets.

9. The process according to claim 1, wherein the original digital video stream and visually deteriorated modified main video stream are organized in frames comprising digital blocks corresponding to at least one selected from the group consisting of a plane I, a plane P corresponding to differences from a previous image P or previous image I, and one plane B corresponding to differences between two P images from a merged image of a preceding and a successive image selected from the group consisting of an image I, an image P and an image B and S planes corresponding to a static image.

10. The process according to claim 9, wherein images I, P and B are modified in a differentiated manner as a function of a constant or variable number of planes per second for the streams characterized by time-dependent scalability.

11. The process according to claim 9, wherein images I, P, B and a static image are modified in a differentiated manner as a function of characteristics of scenes contained in the stream in terms of fixed, static or dynamic planes and/or of the visual forms contained.

12. The process according to claim 9, wherein images I, P, B and a static image are modified in a differentiated manner as a function of their granular scalability.

13. The process according to claim 9, wherein images I, P, B and a static image are modified in a differentiated manner as a function of the size in pixels of the planes in the original digital video stream in pixels and whether the size of the planes in the original digital video stream are constant or variable.

14. The process according to claim 9, wherein images I, P, B and a static image are modified in a differentiated manner as a function of the composition in objects, profiles and levels of the original digital video stream.

15. The process according to claim 9, wherein images I, P, B and a static image are modified in a progressive manner to increase a degradation effect and produce complete scrambling of the original digital video stream.

16. The process according to claim 1, further comprising the step of converting an analog video signal to a digital video stream.

17. The process according to claim 1, wherein the original digital video stream is reconstituted from the visually deteriorated modified main video stream and from the complementary modification information.

18. A system for distributing video sequences comprising a video stream analysis system, a video scrambling system with a scrambling circuit and a first memory in communication with a server having a digital profile of at least one addressee recorded in the first memory; a second memory, a synthesis system and video player in communication with an addressable client having a digital rights profile; and a network in communication with the server and addressable client; wherein the system distributes video sequences by the process of claim 1.

19. The process of claim 1 wherein the original video stream comprises at least two images selected from the group consisting of I images, P images, B images and static images.

20. The process of claim 19 wherein the original video stream has a format selected from the group consisting of MPEG-1, MPEG-2 and MPEG-4.

21. The process of claim 1 further comprising:
a step of reconstituting the original digital video stream from the visually deteriorated modified main video stream and the complementary modification information;
a step of sending a reconstituted original digital video stream to the video player; and
a step of using the video player to display a reconstituted video stream on a screen.

22. The process of claim 1 further comprising:
a step of sending the visually deteriorated modified main video stream to the video player; and
a step of using the video player to display the visually deteriorated modified main video stream on a screen.

* * * * *